(12) United States Patent
Nilssen, II

(10) Patent No.: US 9,032,949 B2
(45) Date of Patent: May 19, 2015

(54) REMOVABLE BASKET ASSEMBLY FOR OUTDOOR GRILL

(75) Inventor: Raymond Nilssen, II, Greenwood, MS (US)

(73) Assignee: Viking Range, LLC, Greenwood, MS (US)

( * ) Notice: Subject to any disclaimer, the term of this patent is extended or adjusted under 35 U.S.C. 154(b) by 837 days.

(21) Appl. No.: 13/100,655

(22) Filed: May 4, 2011

(65) Prior Publication Data

US 2011/0271950 A1 Nov. 10, 2011

Related U.S. Application Data

(60) Provisional application No. 61/331,077, filed on May 4, 2010.

(51) Int. Cl.
*A45C 11/20* (2006.01)
*A45F 3/46* (2006.01)
*A47J 37/07* (2006.01)

(52) U.S. Cl.
CPC ............... *A45F 3/46* (2013.01); *A47J 37/0786* (2013.01)

(58) Field of Classification Search
CPC ................................ A47J 37/0786; A45F 3/46
See application file for complete search history.

(56) References Cited

U.S. PATENT DOCUMENTS

| | | | | |
|---|---|---|---|---|
| 591,390 A * | 10/1897 | Printz | ........................... | 224/433 |
| 694,793 A * | 3/1902 | Schiele | ........................ | 211/106 |
| 1,435,212 A * | 11/1922 | Connor | ........................ | 134/139 |
| 1,478,371 A * | 12/1923 | Albrighton | ................. | 190/12 R |
| 1,582,346 A * | 4/1926 | Oster | ............................. | 312/236 |
| 1,591,336 A * | 7/1926 | Printz | ........................... | 220/485 |
| 1,650,249 A * | 11/1927 | Venable | ........................ | 298/8 R |
| 1,894,664 A * | 1/1933 | Butts | ............................ | 294/67.1 |
| 1,927,665 A * | 9/1933 | Kirby | ............................ | 134/111 |
| 2,035,639 A * | 3/1936 | Davis | ........................ | 211/86.01 |
| 2,040,479 A * | 5/1936 | Glore | ............................ | 99/339 |
| 2,094,915 A * | 10/1937 | Dawson | ........................ | 126/25 R |
| 2,100,675 A * | 11/1937 | Traynor | ....................... | 134/153 |
| 2,101,686 A * | 12/1937 | Offutt | ........................... | 206/511 |
| 2,187,029 A * | 1/1940 | Hevers | ........................ | 220/522 |
| 2,288,689 A * | 7/1942 | Duplin | ....................... | 190/12 R |
| 2,304,312 A * | 12/1942 | Meglitz | ........................ | 225/47 |
| 2,316,186 A * | 4/1943 | Powell | .......................... | 206/200 |
| 2,474,043 A * | 6/1949 | Etches | .......................... | 126/9 R |
| 2,503,807 A * | 4/1950 | Dolas | ............................ | 312/231 |
| 2,568,151 A * | 9/1951 | Hagerty et al. | ............... | 312/242 |
| 2,811,942 A * | 11/1957 | Pineider | ......................... | 440/53 |
| 2,817,331 A * | 12/1957 | Kaplan et al. | ............... | 126/41 R |
| 2,867,471 A * | 1/1959 | Coon, Jr. | ........................ | 296/156 |
| 2,886,386 A * | 5/1959 | Spitzer | ........................ | 108/135 |

(Continued)

FOREIGN PATENT DOCUMENTS

WO WO 92/02165 2/1992
WO WO 0189343 * 11/2001

*Primary Examiner* — Gregory Huson
*Assistant Examiner* — Martha Becton
(74) *Attorney, Agent, or Firm* — Baker Donelson; Dorian B. Kennedy

(57) ABSTRACT

A grill is provided with a removable storage basket assembly for providing a conveniently accessible receptacle or storage platform for articles such as seasonings, cooking tools, towels, or other articles. The storage basket assembly includes a frame having a basket or tray that can be mounted thereto, and a handle. The handle is configured to be received within a recess formed in a shelf of the grill for removably but stably mounting the storage basket assembly on the grill.

8 Claims, 5 Drawing Sheets

(56) References Cited

U.S. PATENT DOCUMENTS

| | | | | |
|---|---|---|---|---|
| 2,890,008 A * | 6/1959 | Melich et al. | | 248/142 |
| 2,919,948 A * | 1/1960 | Williams et al. | | 294/68.26 |
| 2,927,334 A * | 3/1960 | Wonso | | 401/197 |
| 2,933,080 A * | 4/1960 | Adey | | 126/25 R |
| 2,949,199 A * | 8/1960 | Jones | | 414/408 |
| D195,346 S * | 6/1963 | Christoffersen | | D7/394 |
| D195,348 S * | 6/1963 | Christoffersen | | D7/394 |
| D196,996 S * | 11/1963 | Kates | | D7/334 |
| 3,115,107 A * | 12/1963 | Glenny | | 108/152 |
| 3,181,702 A * | 5/1965 | Raphaei | | 211/119 |
| 3,230,948 A * | 1/1966 | Schmitt | | 126/25 R |
| 3,319,916 A * | 5/1967 | Malicoat | | 248/210 |
| 3,382,863 A * | 5/1968 | Katz | | 126/242 |
| 3,398,732 A * | 8/1968 | Barker | | 126/9 R |
| 3,412,887 A * | 11/1968 | Swartwood et al. | | 215/397 |
| 3,611,912 A * | 10/1971 | Choc | | 99/340 |
| 3,709,193 A * | 1/1973 | Moore | | 118/19 |
| 3,775,895 A * | 12/1973 | Jachim | | 43/54.1 |
| 3,796,454 A * | 3/1974 | Williamson et al. | | 294/7 |
| 3,809,051 A * | 5/1974 | Giroux | | 126/9 R |
| 3,846,005 A * | 11/1974 | Harper et al. | | 312/248 |
| 3,854,998 A * | 12/1974 | Jacobs | | 134/191 |
| 3,894,748 A * | 7/1975 | Ratcliff | | 280/641 |
| 3,995,744 A * | 12/1976 | Metcalf | | 211/131.1 |
| 4,140,256 A * | 2/1979 | King | | 294/143 |
| 4,240,398 A * | 12/1980 | Lindop | | 126/25 R |
| 4,337,751 A * | 7/1982 | Sampson et al. | | 126/25 R |
| 4,362,093 A * | 12/1982 | Griscom | | 99/339 |
| 4,364,310 A * | 12/1982 | Rufkahr | | 99/357 |
| 4,445,495 A * | 5/1984 | Frost | | 126/24 |
| 4,688,541 A * | 8/1987 | Stephen et al. | | 126/25 R |
| D296,861 S * | 7/1988 | Fielding et al. | | D7/402 |
| 4,779,365 A * | 10/1988 | Theeten | | 38/135 |
| 4,840,118 A * | 6/1989 | Rinehart | | 99/446 |
| 4,862,792 A * | 9/1989 | Lerma, Jr. | | 99/401 |
| 4,895,068 A * | 1/1990 | Hanagan et al. | | 99/446 |
| 4,899,725 A * | 2/1990 | Barron, Jr. | | 126/41 R |
| 4,899,970 A * | 2/1990 | Berzina | | 248/210 |
| 4,919,109 A * | 4/1990 | Riley | | 126/9 R |
| 4,964,543 A * | 10/1990 | Scheiber | | 222/180 |
| 5,027,788 A * | 7/1991 | Schlosser et al. | | 126/25 R |
| 5,065,569 A * | 11/1991 | Schlueter | | 56/16.6 |
| 5,070,857 A * | 12/1991 | Sarten | | 126/25 R |
| 5,076,257 A * | 12/1991 | Raymer et al. | | 126/41 R |
| 5,095,645 A * | 3/1992 | Borawski | | 43/57.1 |
| 5,121,909 A * | 6/1992 | Stickel, III | | 269/289 R |
| 5,172,328 A * | 12/1992 | Cahlander et al. | | 700/211 |
| 5,186,329 A * | 2/1993 | Fogelberg | | 206/372 |
| 5,213,027 A * | 5/1993 | Tsotsos et al. | | 99/339 |
| 5,265,586 A * | 11/1993 | Salerno | | 126/41 R |
| 5,294,194 A * | 3/1994 | Lombardo | | 312/229 |
| 5,341,793 A * | 8/1994 | Brown | | 126/41 R |
| 5,421,318 A * | 6/1995 | Unruh et al. | | 126/25 A |
| D361,466 S * | 8/1995 | Peterson et al. | | D7/334 |
| 5,579,755 A * | 12/1996 | Johnston | | 126/41 R |
| 5,582,094 A * | 12/1996 | Peterson et al. | | 99/445 |
| 5,588,543 A * | 12/1996 | Finger | | 211/90.01 |
| D377,735 S * | 2/1997 | Craven | | D7/406 |
| 5,711,209 A * | 1/1998 | Guines | | 99/339 |
| 5,730,339 A * | 3/1998 | Stolfo | | 224/148.6 |
| 5,743,417 A * | 4/1998 | Mathis | | 211/119 |
| D395,378 S * | 6/1998 | Schlosser et al. | | D7/403 |
| 5,791,331 A * | 8/1998 | Stewart | | 126/41 R |
| D404,963 S * | 2/1999 | Schlosser et al. | | D7/334 |
| 5,865,409 A * | 2/1999 | Nimer | | 248/210 |
| 5,873,355 A * | 2/1999 | Schlosser et al. | | 126/41 R |
| D406,488 S * | 3/1999 | Bates et al. | | D7/334 |
| D406,489 S * | 3/1999 | Williams et al. | | D7/334 |
| 5,881,891 A * | 3/1999 | Murphy, Jr. | | 211/70.6 |
| 5,906,193 A * | 5/1999 | Leach et al. | | 126/25 R |
| 5,964,473 A * | 10/1999 | Degonda et al. | | 280/250.1 |
| 6,029,646 A * | 2/2000 | Jackson | | 126/30 |
| 6,039,039 A * | 3/2000 | Pina, Jr. | | 126/25 R |
| 6,086,031 A * | 7/2000 | Renfro | | 248/218.4 |
| D429,600 S * | 8/2000 | Fuentes | | D7/409 |
| 6,142,140 A * | 11/2000 | Shumaker | | 126/9 B |
| D435,396 S * | 12/2000 | Wagner | | D7/402 |
| D436,004 S * | 1/2001 | Wagner | | D7/402 |
| 6,182,559 B1 * | 2/2001 | Chiang | | 99/340 |
| 6,209,345 B1 * | 4/2001 | Morton et al. | | 62/457.4 |
| D441,254 S * | 5/2001 | Pai | | D7/403 |
| 6,260,663 B1 * | 7/2001 | Combs | | 182/129 |
| D454,753 S * | 3/2002 | Pai | | D7/402 |
| 6,367,403 B1 * | 4/2002 | Carter | | 114/343 |
| 6,390,427 B1 * | 5/2002 | McConnell et al. | | 248/231.61 |
| 6,435,389 B1 * | 8/2002 | Sucher | | 224/576 |
| D468,954 S * | 1/2003 | Pai | | D7/334 |
| D470,357 S * | 2/2003 | Home | | D7/334 |
| 6,513,515 B1 * | 2/2003 | Wu | | 126/41 R |
| D472,756 S * | 4/2003 | Pai | | D7/334 |
| 6,546,925 B1 * | 4/2003 | Wu | | 126/41 R |
| D475,411 S * | 6/2003 | Hardy et al. | | D19/90 |
| 6,606,987 B2 * | 8/2003 | DeMars | | 126/38 |
| 6,666,343 B1 * | 12/2003 | Liu | | 211/70.7 |
| 6,705,480 B1 * | 3/2004 | Saddler | | 220/4.03 |
| 6,749,074 B1 * | 6/2004 | Hileman et al. | | 211/85.7 |
| D494,020 S * | 8/2004 | Compagnucci | | D7/601 |
| 6,805,246 B1 * | 10/2004 | Manabat | | 211/13.1 |
| 6,883,267 B1 * | 4/2005 | Pruitt | | 43/54.1 |
| 6,925,998 B2 * | 8/2005 | Bruno et al. | | 126/41 R |
| 6,935,327 B1 * | 8/2005 | Williams et al. | | 126/39 BA |
| 6,951,213 B2 * | 10/2005 | Coleman et al. | | 126/38 |
| D525,829 S * | 8/2006 | Chung | | D7/402 |
| 7,178,707 B1 * | 2/2007 | Bokina | | 225/38 |
| 7,201,458 B2 * | 4/2007 | DeMars | | 312/140.2 |
| D546,616 S * | 7/2007 | Tseng | | D7/334 |
| D562,619 S * | 2/2008 | Henley et al. | | D7/334 |
| 7,328,696 B2 * | 2/2008 | Rodriguez | | 126/50 |
| D588,815 S * | 3/2009 | Ghiorghie | | D3/304 |
| D591,565 S * | 5/2009 | Goodman et al. | | D7/637 |
| 7,665,456 B2 * | 2/2010 | DeMars | | 126/38 |
| 7,931,161 B2 * | 4/2011 | Newbould et al. | | 211/106 |
| D640,488 S * | 6/2011 | Didehvar et al. | | D6/525 |
| D652,689 S * | 1/2012 | Goodman et al. | | D7/637 |
| 8,490,614 B1 * | 7/2013 | Gregory | | 126/41 R |
| D690,108 S * | 9/2013 | Goodman et al. | | D3/306 |
| 2002/0020303 A1 * | 2/2002 | Johnson | | 99/339 |
| 2003/0029436 A1 * | 2/2003 | Carden et al. | | 126/41 R |
| 2003/0111070 A1 * | 6/2003 | DeMars | | 126/25 R |
| 2003/0192526 A1 * | 10/2003 | DeMars | | 126/38 |
| 2005/0161416 A1 * | 7/2005 | Anderson | | 211/85.7 |
| 2005/0224433 A1 * | 10/2005 | Heneveld, Sr. | | 211/70.6 |
| 2005/0268228 A1 * | 12/2005 | Fernandes et al. | | 280/47.35 |
| 2006/0011787 A1 * | 1/2006 | Law | | 248/121 |
| 2006/0070613 A1 * | 4/2006 | Cummings et al. | | 126/25 R |
| 2006/0091146 A1 * | 5/2006 | Boulet-Mazer | | 221/34 |
| 2006/0104825 A1 * | 5/2006 | Etter et al. | | 417/234 |
| 2006/0144385 A1 * | 7/2006 | Coleman et al. | | 126/25 R |
| 2006/0169537 A1 * | 8/2006 | Enochs | | 182/129 |
| 2007/0044785 A1 * | 3/2007 | Malafouris | | 126/25 R |
| 2008/0196709 A1 * | 8/2008 | Davis et al. | | 126/39 BA |
| 2008/0245357 A1 * | 10/2008 | Meether et al. | | 126/25 R |
| 2011/0204664 A1 * | 8/2011 | Turdo | | 294/19.2 |
| 2013/0026118 A1 * | 1/2013 | De Lourdes Mireles | | 211/74 |

* cited by examiner

REMOVABLE BASKET ASSEMBLY FOR OUTDOOR GRILL

CROSS-REFERENCE TO RELATED APPLICATION

The present patent application is a formalization of previously filed, U.S. Provisional Patent Application Ser. No. 61/331,077, filed May 4, 2010 by the inventor named in the present application. This patent application claims the benefit of the filing date of this cited Provisional Patent Application according to the statutes and rules governing provisional patent applications, particularly 35 U.S.C. §119(a)(i) and 37 C.F.R. §1.78(a)(4) and (a)(5). The specification and drawings of the Provisional Patent Application referenced above are specifically incorporated herein by reference as if set forth in their entirety.

FIELD OF THE INVENTION

The present disclosure generally relates to a removable basket assembly for a grill. More specifically, the present disclosure relates to a basket that is removably attachable to a grill and that can load, transport, and/or hold articles. The present basket assembly can also be used on other cabinetry and is not limited solely to use with grills.

BACKGROUND OF THE INVENTION

Grilling or cooking outdoors has become increasingly popular, especially during summer months and increasingly during other times of the year as well. With the increased popularity of grilling or cooking outside, consumers have also begun to look for more amenities and optional convenience features in their grills. As a result, outdoor gas or electric grills have become much more sophisticated, typically including one or more side shelves that define preparation surfaces and/or can even include side burners for providing further cooking areas in addition to the grilling surface. However, most grills are still generally limited by size considerations such that their side shelves or preparation areas are correspondingly limited, especially with the use of side burners or storage bins such as ice buckets or the like, which accordingly can restrict or limit the amount of space available to store food and dishes for food preparation, and to provide handy access to cooking implements, seasonings, towels, or other articles that a cook or user may need or desire when grilling out.

Accordingly, it can be seen that a need exists for easily accessible storage systems for grills that address the foregoing and other related and unrelated problems in the art.

SUMMARY OF THE INVENTION

Briefly described, the present invention generally relates to a removable storage basket assembly for use with outdoor grills, although the present invention further can be used with other types of cabinetry and should not be limited solely to use with outdoor grills. Typically, a grill with which the removable storage basket assembly is used generally will have one or more side shelves mounted adjacent the grill surface or cooking area of a grill, which side shelves generally define substantially flat food preparation surfaces, for example, including cutting boards, etc., for assisting the cooking process. At least one of the preparation surfaces or shelves further will include a seating recess formed along a peripheral side edge thereof. The seating recess can be formed with a variety of configurations and generally will include at least one or more seating projections located within the recess.

The removable storage basket assembly will be received and seated within the seating recess to provide conveniently accessible storage for various articles including cooking implements such as cooking tools, seasoning bottles, drinks, towels, etc. The storage basket assembly generally will include a frame that can include one or more upstanding legs attached to a handle, and with the frame supporting a receptacle, such as a tray or basket, at a lower end thereof. The handle generally is configured so as to fit within the seating recess with sufficient clearance to enable easy location and removal of the handle within the seating recess while still restricting any sliding or shifting movement of the handle so as to stably maintain the storage basket assembly within the seating recess. The handle generally will engage and seat upon one or more seating projections within the seating recess.

The receptacle or tray of the storage basket assembly can be formed as a wire frame basket, or of other configurations, including having defined holders or partitions for seating articles such as condiment bottles, cooking implements or tools, boxes or other articles therein in defined spaces or locations with such articles being secured against falling over or out of the tray, while still being positioned at a location that is easily accessible to the cook or grill user. Additional racks, projections, connecting hooks, or other storage devices also can be provided on the frame such as for holding rolls of paper towels, holding hand towels, and/or for storing other, larger cooking implements in a simple, conveniently accessible location adjacent the cooking area.

Those skilled in the art will appreciate the above stated advantages and other advantages and benefits of various additional embodiments upon reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION

Figure 1:
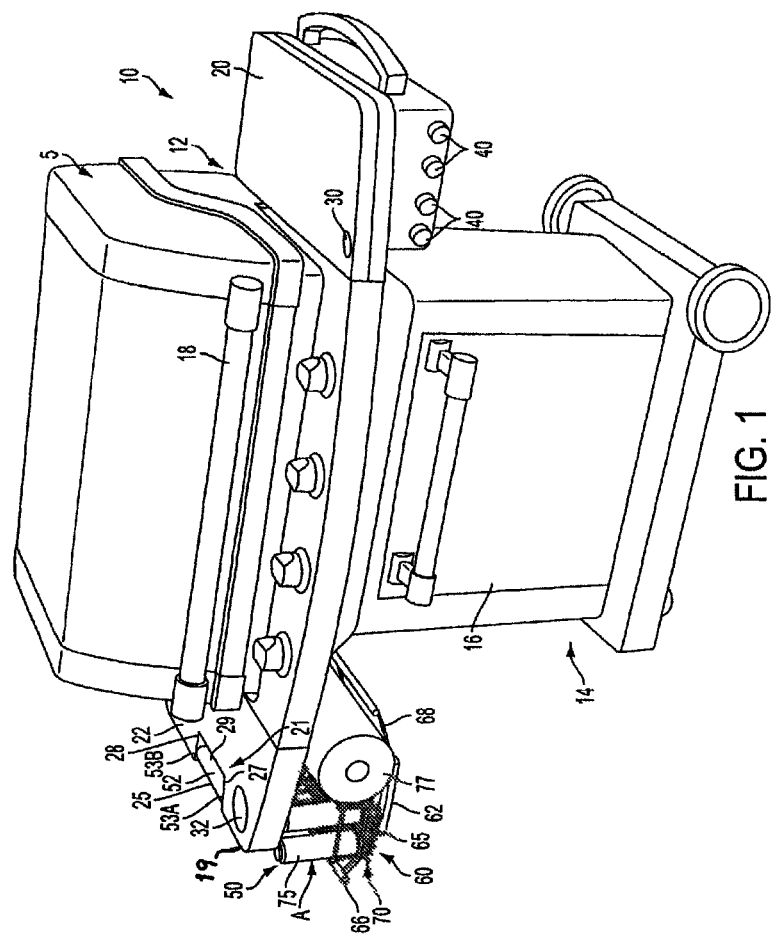
FIG. 1 shows a front perspective view of a grill with a removable basket according to one embodiment of the invention.

Referring now to the drawings, FIG. 1 shows a front perspective view of a grill 10 with a removable basket assembly 50 mountable thereto for holding various articles A, according to one embodiment of the invention. In the illustrated embodiment the grill 10 is shown as an outdoor gas fueled grill. However, it will be understood by those skilled in the art that the present invention can also be used with other types of grills or cooking assemblies as well.

Figure 2:
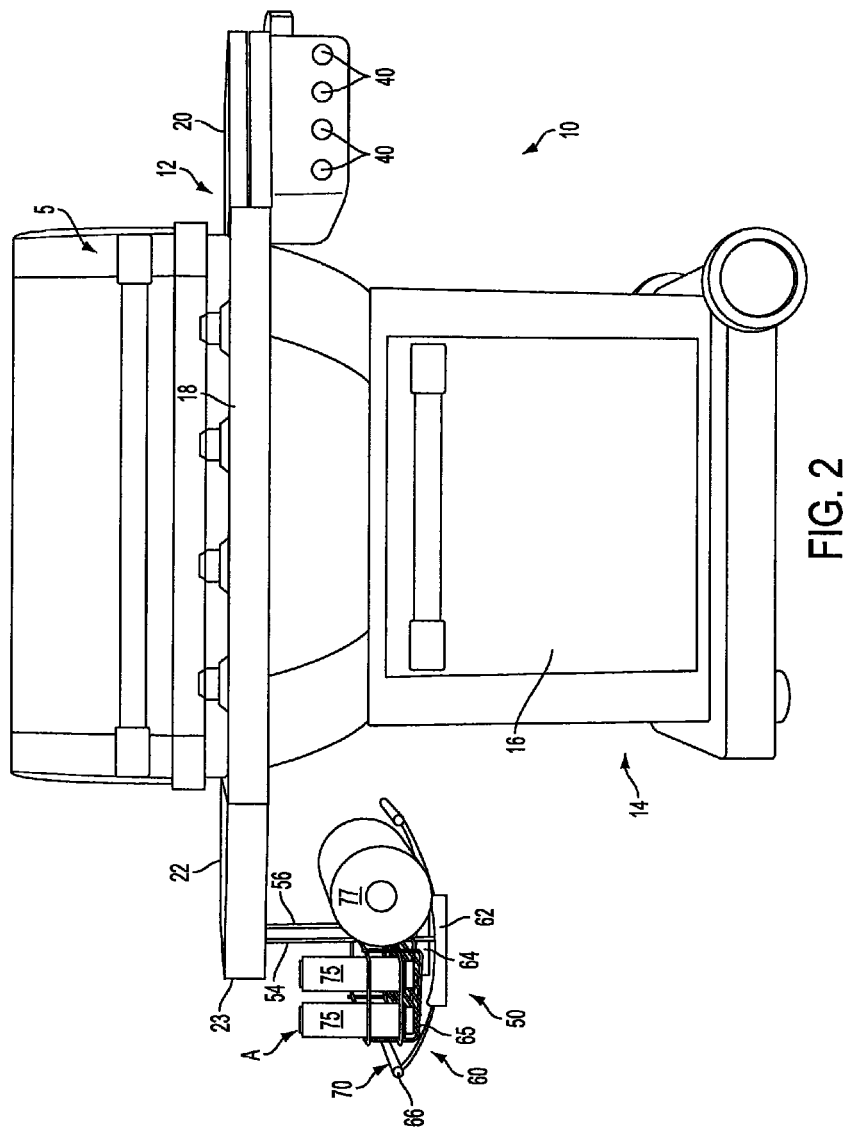
FIG. 2 shows a front view of the grill of FIG. 1.

As illustrated in FIGS. 1-2, the grill 10 includes an upper portion 12 and a lower portion or base 14. The base 14 optionally can include a space (such as a cabinet) closed by a door 16. The upper portion 12 is shown in FIG. 1 with shelves 19 defining preparation surfaces 20 and 22 disposed on either side of a grill or cooking surface disposed under a lid 5. The grill surface can be further divided into one or more cooking zones or areas that can be independently heated as needed. The lid 5 is operable by a handle 18 to enable opening and closing of the lid. Preparation surface 20 as shown in FIG. 1 can include an optional mounting hole 30, which can receive, for example, a lighting assembly (not shown) that would allow a user to direct the light to certain areas of the grill 10 or preparation surface 20. The grill 10 further can include grill tool hang protrusions 40, which are capable of hanging grilling utensils or tools for ease of use during grilling. Preparation surface 22 further is shown with (optional) drink holder holes 32 and 34 (shown in FIGS. 3A-3B).

Figure 3A:
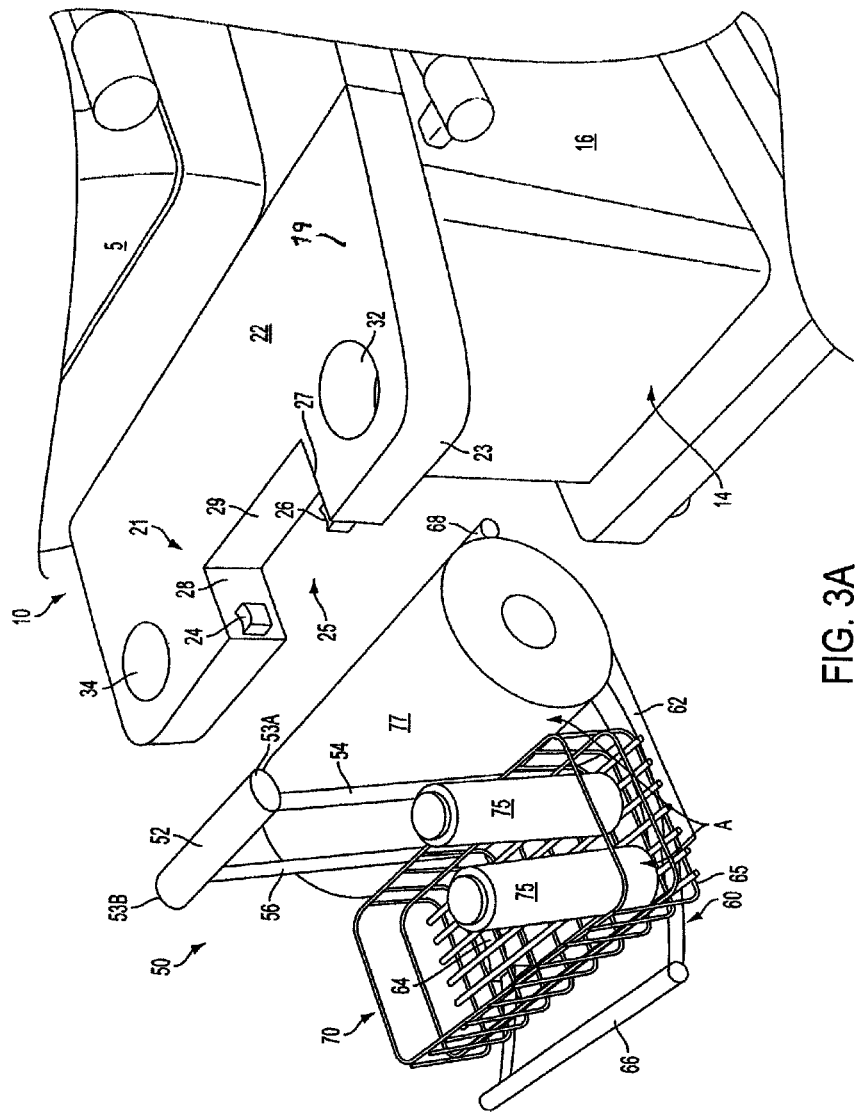
FIG. 3A shows the basket removed from the grill.

FIG. 2 shows a front view of the grill of FIG. 1 with the removable basket assembly 50 being mountable along an open-sided recessed area or portion 21 formed along a peripheral side-edge 23 of preparation surface 22. FIG. 3A shows the basket assembly 50 removed from the grill and adjacent the recess. Generally, the basket assembly 50 is removable from the recess by lifting its handle 52 upward.

Figure 3B:
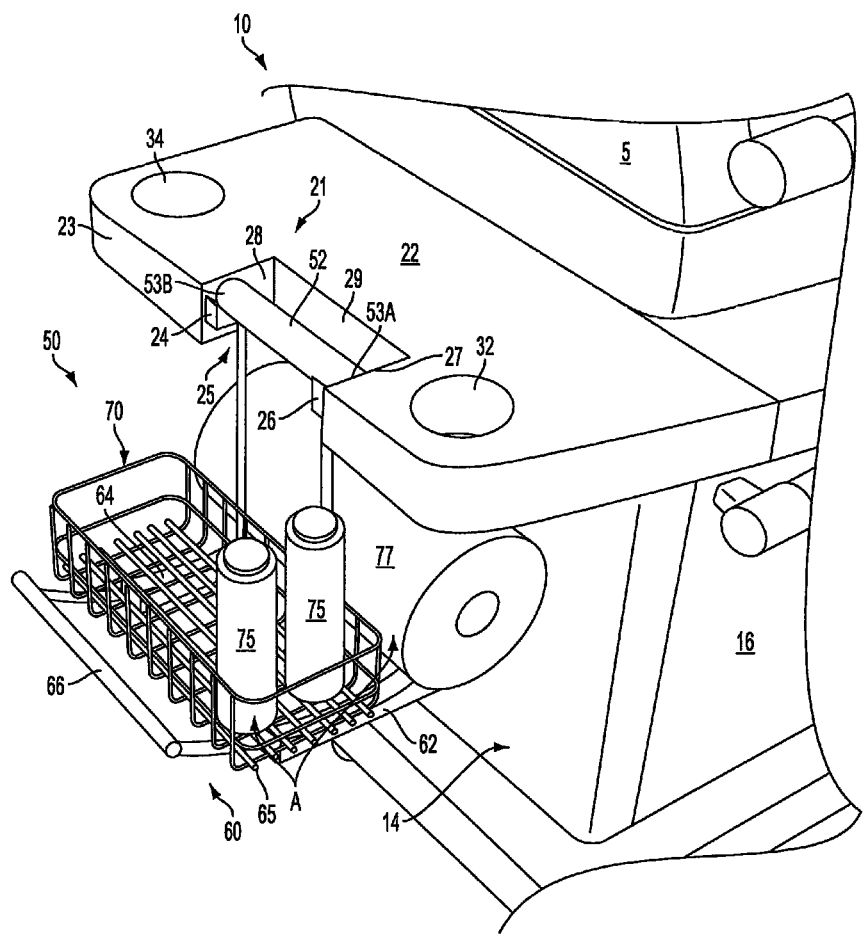
FIG. 3B shows the basket installed in a seated position on the grill.
Figure 4:
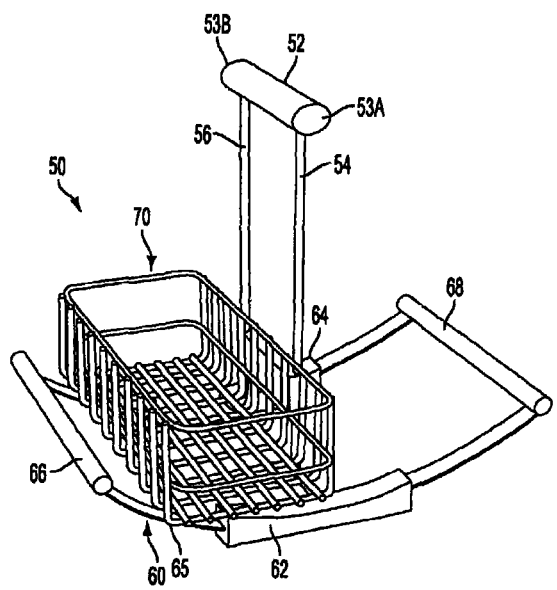
FIG. 4 shows a perspective view of the basket.

As noted, the upper portion 12 of the grill 10 generally includes open sided seating recess 21 formed along outer peripheral side edge 23 of preparation surface 22, which recess is adapted to receive and seat the handle 52 of the basket assembly therein. As shown in FIGS. 3A-3B, the recess 21 generally can have rectangular or substantially square configuration, though other configurations such as elliptical, oblong, etc., also can be used, and typically has a series of side walls 27-29 defining an opening 25 through which the handle 52 of the basket assembly is received for ease of mounting within and removal from the recess. The recess 21 further includes one or more seating protrusions 24 and 26 generally mounted on opposite side walls 27/28 of the recess, and which receive handle 52 when basket assembly 50 is returned to a seated position (shown in FIG. 3B). The protrusions 24 and 26 can be hooks, seats, recesses, removable plugs, or other arrangements capable of securely receiving and holding at least a portion of handle 52 of basket 50 in a stable manner to prevent the basket from being dislodged inadvertently.

As indicated in FIG. 3A the basket assembly 50 is installed into a seated position within the recess 21 of the preparation area 22 or shelf 19 with the ends 53A/53B of its handle 52 received within protrusions 24 and 26 to mount the basket assembly to the grill. FIG. 3B shows the basket assembly 50 in the seated position with its handle 52 seated in protrusions 24 and 26, which can include engaging the handle in a frictional fit. As indicated, the handle 52 is shown as cylindrical, though other shapes or configurations also can be used, and further is configured so as to fit within the recess 21, with its ends 53A/53B in engagement with seating protrusions 24/26 so as to restrict any lateral sliding or shifting movement of the handle and maintain the basket assembly in a stable mounted position adjacent the cooking and preparation areas of the grill for convenient and easy access to the articles A contained therein.

FIGS. 3A-3B and 4-5 show perspective views of one example embodiment of the basket 50. The basket assembly 50 generally includes handle 52 disposed at upper ends of legs 54 and 56. The basket assembly also typically includes a frame 60 mounted to legs 54 and 56, and generally is made from a high strength, heat resistant material such as steel, aluminum, or other metal material wire, or a plastic, synthetic, or composite material. The frame 60 further can include feet 62 and 64 that are sized to allow the basket assembly 50 to be placed on a surface with the feet 62 and 64 spaced apart and generally aligned parallel to the surface 65 of the basket assembly and with the legs 54 and 56 generally perpendicular to the bottom surface 65 of the basket assembly. The feet 62/64 further generally will be of a size to help stably support the basket assembly in a balanced, flat-lying attitude when resting on a surface instead of being mounted within the seating recess 21, and can include a cushioned and/or non-skid surface or material.

Figure 5:
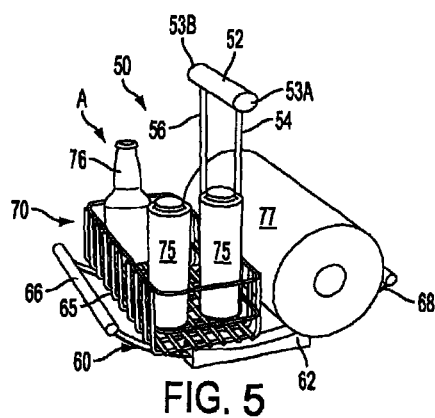
FIG. 5 shows the basket holding sample items.

As shown in FIGS. 1-5, the frame 60 of the basket assembly 50 can be fitted with receptacles capable of holding articles therein, such as tray or basket 70. The frame of tray 70 also can be formed with a series of cross-connected wires, or with a lattice or mesh type construction to minimize weight and enable passage of dirt, debris and/or liquids therethrough, and further could include holders or other areas/sections adapted to secure and hold items such as bottles or cans. The frame 60 further can include frame elements that are sized to receive and/or hold items directly on the frame 60, such as towel rack or bar 66, and paper towel roll holder 68. These frame elements also can be removably attached to the frame 60 of the basket assembly 50, or can be fixedly attached thereto, and can be modified in size for various sizes of grills as needed. FIG. 5 further shows the basket assembly 50 holding sample articles or items A such as ketchup or mustard bottles 75, seasoning jars, drinks 76, a paper towel roll, etc., in tray 70 and on holder 68.

Accordingly, the present basket assembly 50 provides an efficient means to load, transport, and/or hold various articles that could be needed or desired for cooking with or cleaning of the grill 10 while leaving the preparation surface(s) clear for use, and it also will be understood that various sizes and configurations of baskets or trays can be used. Alternatively, the basket assembly 50 can be used to house items when the grill 10 is not in use. Alternatively still, the basket assembly 50 could be used as a means to load, transport, and/or hold various articles A without the need or desire to use such articles with or for cooking on or clearing of the grill 10.

In use, the basket or tray of the basket assembly can be loaded with desired articles such as bottles of sauces, seasonings or even drinks, with cooking implements or tools also being attached, and further can be provided with towels or other cleaning implements, and can be carried by its handle and placed or located on the grill by seating the handle of the storage basket assembly within the seating recess of the grill. As a result, the articles contained within the storage basket assembly are located below the flat preparation surface of the grill so as to leave the preparation surface uncluttered and free for use as a food preparation surface, etc., while still facilitating or providing easy and convenient access to such articles by the grill user. When the grill user is done cooking, they can simply remove the storage basket assembly by its handle and use the storage basket assembly to easily carry and transport all the various cooking implements or articles back inside.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments that are within the scope of the claims.

Additionally, while the disclosure shows and describes selected embodiments of the disclosure, the disclosure is capable of use in various other combinations, modifications, and environments and is capable of changes or modifications within the scope of the inventive concept as expressed herein, commensurate with the above teachings, and/or within the skill or knowledge of the relevant art. Furthermore, various features and characteristics of each embodiment may be selectively interchanged and applied to other illustrated and non-illustrated embodiments of the disclosure.

What is claimed is:

1. A grill with a removable storage basket assembly comprising:
   a base;
   a cooking area;
   at least one preparation surface adjacent the cooking area having an upper portion, a peripheral side edge portion, and at least one recess formed along the peripheral side edge portion, the recess having two oppositely disposed sidewalls and a seating protrusion extending from each sidewall, the oppositely disposed sidewalls being spaced from each other a select distance; and
   a removable storage basket assembly having a frame with at least one upstanding leg, a generally horizontally extending handle coupled to the upstanding leg and configured to be grasped by a person, and at least one article receptacle mounted to the frame, the handle having oppositely disposed handle ends spaced from each other a select width less than the recess select distance so that each oppositely disposed handle end is positioned closely adjacent each oppositely disposed sidewall when the handle is positioned within the recess and resting upon the protrusions,
   wherein the basket can be loaded with articles and can be mounted on the grill to provide easy access to the articles, and thereafter can be removed as needed, with the articles remaining therein for ease of transport.

2. The grill of claim 1, wherein the storage basket assembly further comprises a towel rack.

3. The grill of claim 1, wherein the at least one receptacle of the storage basket assembly comprises a tray mounted on the frame.

4. The grill of claim 1, wherein the seating protrusions include a concave seating portion.

5. The grill of claim 4 and wherein the handle of the basket assembly comprises a substantially cylindrical body having spaced find and second ends configured to matingly seat within the concave seating portions of the seating protrusion.

6. A grill with a removable storage basket assembly comprising:
   a cooking area;
   a storage basket assembly having a generally horizontally disposed elongated handle having oppositely disposed ends, and
   a shelf mounted to the cooking area, the shelf having a peripheral side edge, a recess extending inwardly from the peripheral side edge defined by a plurality of sidewalls, and at least one protrusion extending outwardly from at least one sidewall, said recess being configured to receive the storage basket assembly elongated handle upon the protrusion in a horizontal position with each oppositely disposed end positioned closely adjacent a recess sidewall to substantially prevent longitudinal movement of the elongated handle.

7. The grill with a removable storage basket assembly of claim 6 wherein the at least one protrusion comprises two oppositely disposed protrusions wherein each protrusion is mounted to one sidewall of the plurality of sidewalls.

8. The grill with removable storage basket assembly of claim 7 wherein each end of the handle contacts and rests upon one protrusion.

* * * * *